United States Patent

Bevington

[15] 3,698,744
[45] Oct. 17, 1972

[54] AXIALLY LOCKED PIPE JOINT
[72] Inventor: William J. Bevington, West Lafayette, Ohio
[73] Assignee: Clow Corporation, Oak Brook, Ill.
[22] Filed: Jan. 6, 1971
[21] Appl. No.: 104,437

[52] U.S. Cl. .................285/111, 285/376, 285/416
[51] Int. Cl. .............................................F16l 17/02
[58] Field of Search......285/111, 286, 376, 377, 416, 285/321, 403

[56] References Cited

UNITED STATES PATENTS

| | | | |
|---|---|---|---|
| 2,774,617 | 12/1956 | Lanninger | 285/111 X |
| 2,806,717 | 9/1957 | Hempel | 285/376 X |
| 3,219,364 | 11/1965 | Wooldridge | 285/111 X |
| 3,521,911 | 7/1970 | Hanes et al. | 285/321 X |
| 2,459,872 | 1/1949 | Cox | 285/416 |

FOREIGN PATENTS OR APPLICATIONS

| | | | |
|---|---|---|---|
| 948,463 | 8/1956 | Germany | 285/111 |

*Primary Examiner*—David J. Williamowsky
*Assistant Examiner*—Wayne L. Shedd
*Attorney*—William S. Rambo

[57] ABSTRACT

A joint for cast metal pipe in which relatively telescoping, gasket-sealed spigot and bell members are locked together against axial separation by a locking collar arrangement which permits limited, universal pivoting movement or angular deflection between the spigot and bell members without interference with the sealing function of the gasket.

1 Claim, 5 Drawing Figures

INVENTOR.
W. J. BEVINGTON
BY
*W. S. Rambo*
ATTORNEY

INVENTOR.
W.J. BEVINGTON
BY
W. H. Rambo
ATTORNEY

AXIALLY LOCKED PIPE JOINT

BACKGROUND OF THE INVENTION

The present invention relates generally to pipe joints, and more specifically to an improved axially-locked, gasket-sealed joint for cast metal pipe which provides for limited angular deflection between the joined pipe members.

In the past, numerous different types of so-called "locked" joints have been proposed for connecting a pair of adjoining cast pipe sections against axial separation in response to internal pressures or forces. One of the older types, commonly known as a "caulked" joint, comprised a spigot section formed with an integrally cast, radially enlarged bead thereon which was adapted to be placed within an adjoining, recessed bell section and locked therein by a mass of lead or other sealing material which was poured or caulked into the gap between the telescoped spigot and bell sections. While these so-called "caulked" joints provided an effective locking arrangement between the adjoining pipe sections, they did not permit or provide for any subsequent angular deflection between the joined pipe sections in response to soil subsidence or other deflection loads applied thereto after subterranean embedment of the pipe sections. With the advent of modern centrifugal casting processes, it was no longer possible or practicable to cast the radially enlarged locking bead on the spigot section and, hence, the so-called "caulked" joint was largely abandoned in favor of bolted and locked types of "stuffing box" joints. Here again, while the "stuffing box" types of locking joints were fairly effective in mechanically locking the pipe sections against axial separation, they either failed to provide for subsequent angular deflection of the joined pipe sections, or were subject to leakage since the axial loading applied to the joint bolts tended to elongate them and thereby reduce gasket compression.

Still other types of locked joints proposed by the prior art involved the application of various locking mechanisms to so-called "push-on" joints of the type which incorporated a resilient annular sealing gasket held under compression between the relatively telescoping spigot and bell sections. One such locking mechanism took the form of a series of metal clips molded into the sealing gasket and arranged to engage a grooved spigot upon joint assembly thus providing a barb-like locking arrangement between the telescoping spigot and bell sections to prevent subsequent axial separation of such sections. Another such locking mechanism used in association with gasketed push-on joints comprised one or more external, bolt-tightened clamping or follower rings arranged to hold the telescoped spigot and bell members against axial separation. However, all of these locking mechanisms either failed to provide for angular deflection of the pipe sections after assembly of the joint, or created an imbalance of stresses on the locking components upon angular deflection of the joined pipe sections.

Yet another type of locked joint proposed by the prior art is the so-called ball and socket joint in which the telescoped end of the spigot section is formed or otherwise provided with an outer, radially enlarged, arcuate or segmental spherical surface arranged to fit within a cooperatively curved concave socket formed within the bell section of the joint, and wherein an annular locking collar is carried on the spigot section behind the radially enlarged ball portion for locking engagement with the bell section. While the so-called ball and socket joints are designed to provide for relative angular deflection or axial misalignment of the adjoining pipe sections, such joints are extremely expensive due to the necessity for accurately machining the complemental ball and socket surfaces.

SUMMARY AND OBJECTS OF THE INVENTION

The present invention provides an improved locked joint for cast metal pipe which comprises the usual relatively telescoping spigot and bell sections and a resilient sealing gasket carried within the bell section and elastically embracing the telescoped end portion of the spigot, in combination with a bearing or retainer ring carried on the spigot section exteriorly of the bell and an annular locking collar having an inner arcuately concave bearing surface embracing the bearing ring and provided with means for securely locking the collar to the bell section, the concave bearing surface of the locking collar being arranged in cooperation with the bearing ring of the spigot to permit limited universal pivoting movement between the telescoped spigot and bell sections while at the same time securely holding said sections against axial separation.

The primary object of the present invention is to provide a locked joint for cast pipe which permits limited universal angular deflection between the telescoped pipe sections without interference with the sealing function of the resilient sealing gasket, and which may be fabricated from cast parts which do not require accurate and expensively machined surfaces.

Another object is to provide an improved locking mechanism for gasketed bell and spigot pipe joints in which the axial load forces which tend to separate the pipe sections are uniformly distributed throughout the locking mechanism under all conditions of allowable deflection of the pipe section.

These and other objects and advantages of the invention will become more readily apparent by reference to the following description and the accompanying drawings.

DESCRIPTION OF PREFERRED EMBODIMENTS

Figure 1:
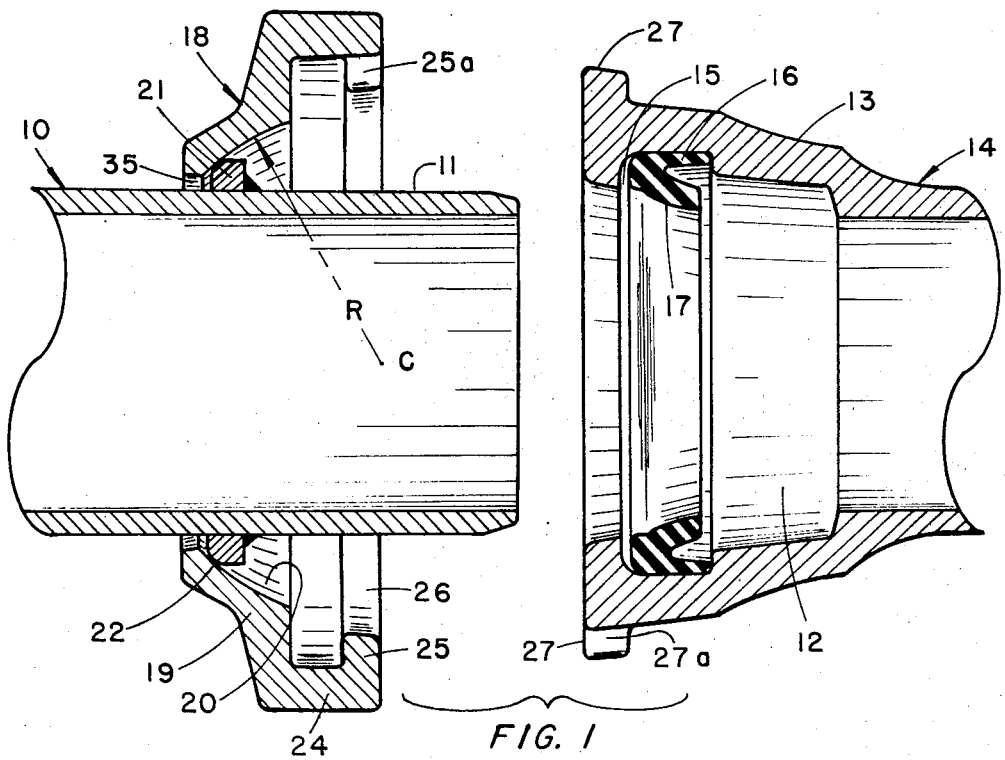
FIG. 1 is an exploded, longitudinal sectional view of a preferred form of joint according to this invention and showing the several parts of the joint prior to assembly.

With reference to the drawings, it will be seen that the present invention embodies a first pipe member 10 formed at one end thereof with a cylindrical spigot portion 11 arranged to telescope within the socket 12 of the diametrically enlarged bell portion 13 of a second pipe member or other pipe fitting 14. The bell portion 13 is formed on its inner surface with an annular recess or groove 15 in which is positioned an annular, resiliently compressible sealing gasket 16 having an inner web portion 17 sized to elastically embrace and form a fluid tight seal with the spigot portion 11 upon axial insertion thereof within the socket 12. The diameter of the entrance opening of the socket 12 is slightly greater than the outer diameter of the spigot portion 11, so as to permit a limited amount (say from 3°–5°) of axial deflection or universal pivoting movement between the adjoining pipe members 10 and 14, as indicated by the broken deflection lines in FIG. 2. It will be understood that the structure and parts heretofore described are more or less conventional and well-known in the push joint art, as evidenced by prior U.S. Pat. No. 3,390,890 issued July 2, 1968 to Ralph W. Kurtz, and as such, form no part of the present invention except in combination with the structural elements and parts hereinafter described.

Figure 5:
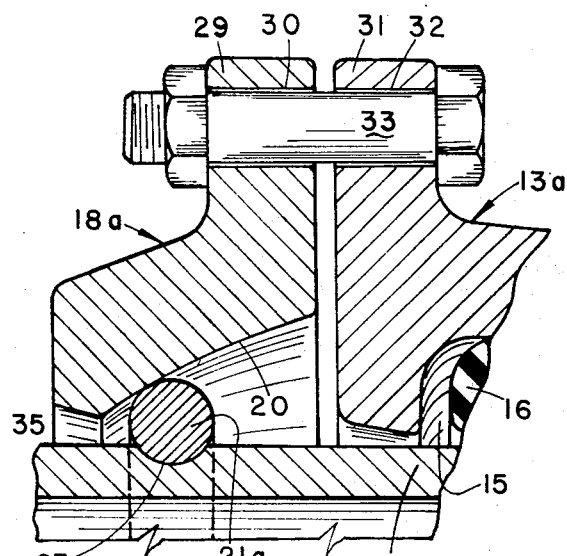
FIG. 5 is an enlarged, fragmentary sectional view showing a modified form of bearing ring and joint locking mechanism.

According to this invention, mechanism is provided for securely locking the relatively telescoped and gasket-sealed spigot and bell portions against axial separation, while at the same time permitting limited angular deflection or universal pivoting movement between the adjoining pipe members 10 and 14. Toward this end, the pipe member 10 is provided with an annular locking collar 18 arranged for limited swiveling and universal pivoting movement on the spigot portion 11. The collar 18 is formed with a curved body portion 19 having an inner, arcuately concave, or segmento-spherical, bearing surface 20. The collar 18 is retained against removal from the spigot portion 11 by an annular bearing ring 21 which is fixed circumferentially on the outer surface of the spigot portion 11 such as by welding. In the preferred form of the joint, as shown in FIGS. 1–4, the bearing ring 21 is generally rectangular in cross-section except for an arcuately curved outer edge surface 22 (see FIG. 4) which is arranged for relatively sliding engagement with the bearing surface 20 of the locking collar 18. Alternatively, as shown in FIG. 5, the bearing ring may take the form of a hoop or ring 21a of circular cross-section which is seated in a shallow, concave, annular recess or groove 23 formed in the outer wall of the spigot portion 11. The circular type bearing ring 21a of FIG. 5 is a split ring which may be resiliently expanded so as to pass over the spigot end of the pipe member 10 and then snap into the annular seat or groove 23.

Referring once again to FIGS. 1–4, the collar is further formed with a diametrically enlarged, axially projecting, annular web portion 24 which terminates in a plurality of relatively spaced apart, radially inwardly turned locking flanges or lugs 25. The lugs 25 are disposed in equidistant, circumferentially spaced relation around the entrance opening 26 of the collar and are arranged for interlocking engagement with a like number of cooperative, radially outwardly projecting flanges or lugs 27 formed or otherwise provided on the peripheral surface of the bell portion 13 adjacent the entrance opening thereof. As will be noted particularly in FIG. 3, the circumferential length and spacing of the locking lugs 25 and 27 is such as to provide intervening slots 25a and 27a between the sets of lugs. Upon insertion of the spigot portion 11 within the socket 12 of the bell portion 13, the locking collar 18 is rotationally positioned to permit the lugs 25 of the collar 18 and the lugs 27 of the bell portion 13 to pass through the slots 27a and 25a of the respective members. Then by partially rotating the locking collar 18, the lugs 25 may be brought into alignment and locking engagement with the lugs 27 in the manner of a bayonet lock to thus lock the adjoining pipe members against axial separation.

Figure 4:
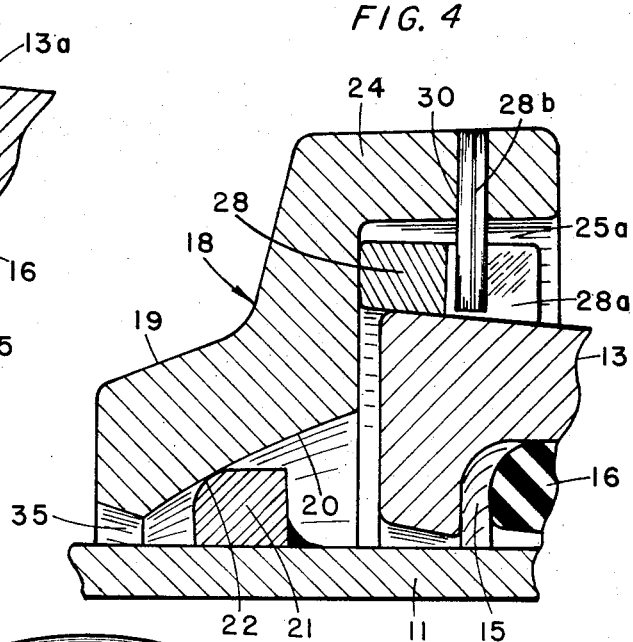
FIG. 4 is an enlarged, fragmentary sectional view taken along the line 4—4 of FIG. 3 and showing one means of securing the locking collar against accidental rotational disengagement.
Figure 3:
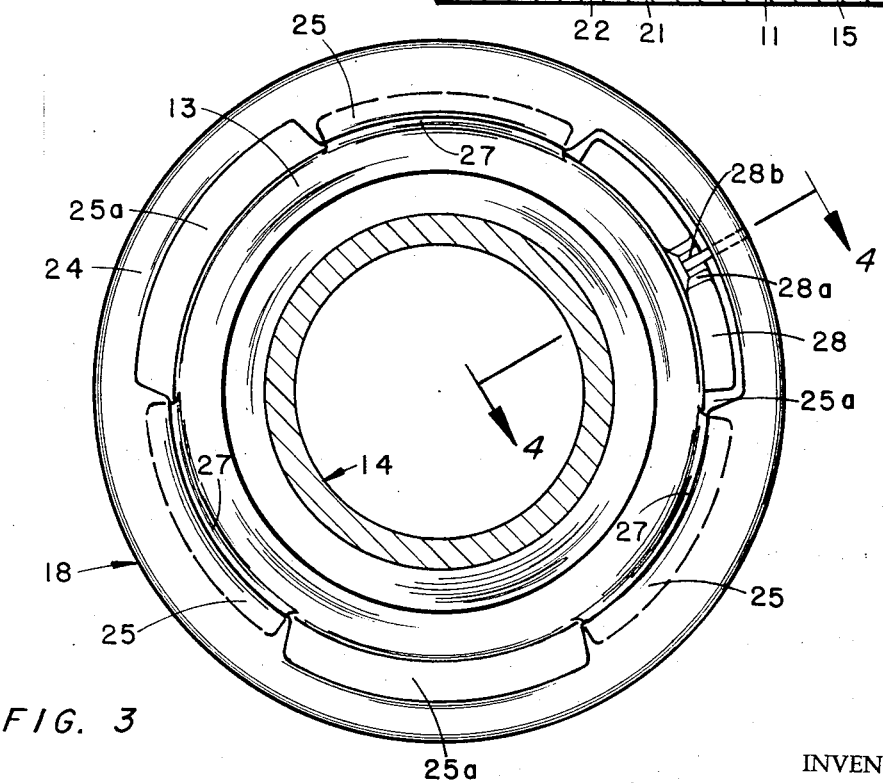
FIG. 3 is a transverse vertical sectional view taken along a plane indicated by the line 3—3 of FIG. 2.

Preferably, means are provided to prevent accidental rotational disengagement of the locking collar 18 from its locked position. Such means is illustrated in FIG. 4 and comprises an arcuate slug or key 28 which is sized to loosely fit within one of the slots or spaces 25a–27a following rotational engagement of the lugs 25 and 27. The key 28 is formed with a centrally located notch or groove 28a, and the key 28 is held in its locking position by means of a split-type locking pin 28b which is driven through a radial bore or opening 30 formed in the axial web portion 24 of the locking collar 18 and into the notch 28a of the key. The key 28 is thus held in position to prevent relative rotational disengagement of the lugs 25 and 27 after the collar 18 is locked onto the bell portion 13, but can be subsequently removed should it be desired to disassemble the joint.

FIG. 5 of the drawings, in addition to showing a modified form of bearing ring 21a, also illustrates a modified form of locking arrangement for connecting the locking collar 18a with the bell member 13a. In this instance, the bayonet-type locking mechanism illustrated in FIGS. 1–4 is replaced by a bolted flange connection between the collar 18a and the bell member 13a. Toward this end, the collar 18a is formed adjacent its entrance end with a radially outwardly projecting, circumferential flange 29 which is provided at circumferentially spaced intervals with axially disposed bolt-receiving openings or passages 30. The bell member 13a is likewise formed with a complemental, radially outwardly projecting flange 31 having bolt-receiving openings 32 for alignment with the openings 30 of the collar flange 29. Following insertion of the spigot portion 11 within the bell member 13a, the collar 18a may be securely locked to the bell member by clamping bolts 33 which extend through the axially aligned openings 30 and 32 of the flanges 29 and 31. As will be readily understood, the flanges 29 and 31 may extend continuously around the collar 18a and bell member 13a, or they may comprise a series of interrupted, circumferentially spaced flange segments. In this regard, it will be understood that various other forms of locking or fastening arrangements may be employed to securely connect the collar to the bell member without departing from the spirit of this invention.

Figure 2:
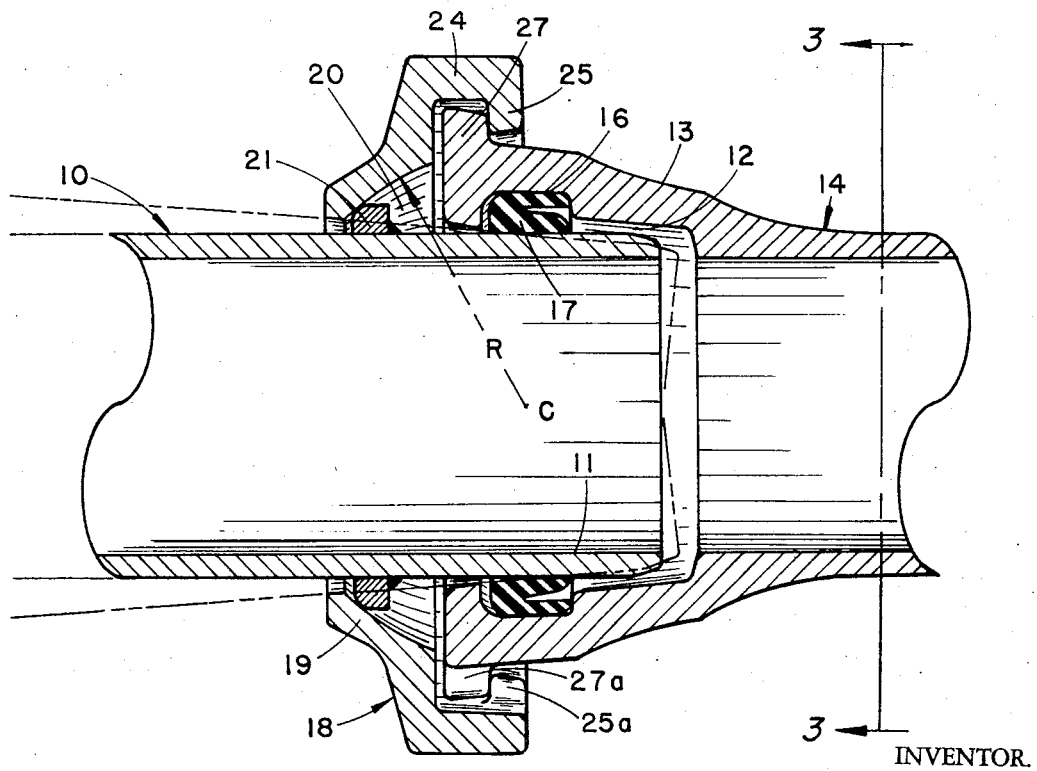
FIG. 2 is a medial, longitudinal sectional view of the assembled joint.

As indicated particularly in FIGS. 1 and 2, the arcuately concave bearing surface 20 of the locking collar 18 has a radius of curvature R which is substantially greater than the radius of curvature of the rounded or curved outer edge surface 22 of the bearing ring 21, so as to provide for a substantially circular line of contact between these surfaces in all positions of permissible angular deflection of the adjoining pipe sections. This line contact between the bearing surfaces of the collar 18 and the bearing ring 21 minimizes the frictional drag between these surfaces upon relative angular deflection or limited universal pivoting movement between the joined pipe members. It is also important that the bearing surface 20 of the locking collar 18 be so arranged that its center of curvature C is located at or closely adjacent to the radial plane of the gasket 16 when the joint is assembled, since the gasket 16 usually provides a fulcrum point or ring about which the spigot portion 11 of the joint can deflect. The range or degree of angular deflection between the respective pipe sections 10 and 14 will be determined primarily by the relative diameters of the outer surface of the spigot member 11, the internal diameters of the bell member 13, and the minimum diameter of the inner, spigot-receiving opening 35 of the locking collar 18. Since cast metal pipes are subject to relatively large dimensional tolerances the degrees of possible angular deflection may vary in any particular joint, but will preferably range from 3°–5°.

In view of the foregoing, it will be seen that the present invention provides an improved locked joint for cast pipe which permits limited universal pivoting movement or angular deflection between the joined pipe sections without interference with the sealing function of the associated sealing gasket.

While presently preferred embodiments of the invention have been illustrated and described in detail, it will be understood that various modifications as to details of construction and design may be resorted to without departing from the spirit of the invention or the scope of the following claims.

What is claimed is:

1. In a pipe joint which includes relatively telescoping, substantially cylindrical bell and spigot members and an annular, resilient sealing gasket carried in said bell member and elastically embracing said spigot member and providing a fulcrum for limited angular deflection of said members; that improvement which comprises:
   a. an annular bearing ring carried circumferentially on said spigot member and defining thereon a radial enlargement disposed in axially outwardly spaced relation to said bell member, said bearing ring being formed with an outer, arcuately convex bearing surface;
   b. an annular locking collar carried for limited, universal pivoting movement on said bearing ring and having an inner diameter greater than the outer diameter of said spigot member, but less than the outer diameter of said bearing ring, said locking collar being formed with an inner, arcuately concave bearing surface engaging the arcuately convex bearing surface of said bearing ring and having a center of curvature disposed approximately at the center of a radial plane passing through the medial portion of said gasket; the radius of curvature of the concave bearing surface of said locking collar being co-operatively greater than the radius of curvature of the convex bearing surface of said bearing ring whereby to provide a full circle line of contact between said bearing ring and said locking collar throughout the full range of angular deflection of said bell and spigot members; and
   c. means detachably connecting said locking collar with said bell member and preventing accidental axial separation thereof.

* * * * *